July 17, 1962 H. MEYER 3,045,060

SIGNAL-SEEKING TUNING DRIVE SYSTEM

Filed Sept. 11, 1959 4 Sheets-Sheet 1

INVENTOR:
HERBERT MEYER
BY [signature]
PATENT AGENT

INVENTOR:
HERBERT MEYER
BY
PATENT AGENT

INVENTOR:
HERBERT MEYER
BY
PATENT AGENT

July 17, 1962 H. MEYER 3,045,060

SIGNAL-SEEKING TUNING DRIVE SYSTEM

Filed Sept. 11, 1959 4 Sheets-Sheet 4

INVENTOR:
HERBERT MEYER
BY [signature]
PATENT AGENT

United States Patent Office 3,045,060

Patented July 17, 1962

3,045,060

SIGNAL-SEEKING TUNING DRIVE SYSTEM

Herbert Meyer, Worzeldorf, near Nurnberg, Germany, assignor to Nurnberger Schwachstrombauelemente Fabrik Gesellschaft mit beschränkter Haftung, Nurnberg, Germany Filed Sept. 11, 1959, Ser. No. 839,349
9 Claims. (Cl. 178—5.8)

The present invention relates to a signal seeking drive motor system, particularly for band switches in television sets and for automatic fine tuning of the band.

Motor drives for channel switches have been known per se. In the prior art, channel switches are used which are tuned to predetermine receiving channels within a given band marked by given detent positions and in which the position of the drive is controlled substantially mechanically, such as, for example, by a drum switch in such a manner that the drum is rotated by the motor until the tuning elements on the drum corresponding to the selected channel establish contact with a stationary cooperating contact circuit.

In contrast to this, the invention relates to a motor drive, particularly for television band switches, in which tuning takes place automatically at least within the width of each individual television band, whereby a tuning element which is continuously tuned through the frequency range, i.e., through the different channels within each band, for example a rotary condenser or a slidable variometer, is driven by a control motor which is controlled by means of an automatic fine tuning means operating normally in a search run, and wherein upon receipt of a signal the motor is switched to a control element, for example a control relay or a control tube, whereupon fine adjustment is obtained.

In order to assure that the tuning apparatus containing the automatic means responds only to such signals which correspond to the picture frequency of the receiving channels to be selected, the tuning device according to the invention is designed in such a manner that the scanning operation is interrupted only when the automatic device responds to signals of the picture and sound units which are assigned to a standard television channel having the defined frequency separation between the picture and the sound carriers. This result is obtained, for example, by providing a first control element, for example a control relay or a control tube, and connecting it with the picture and sound units in such a manner that it responds only to the signals present in the picture and sound units of the television set and simultaneously having the defined frequency separation, the presence thereof interrupting the scanning operation. The system also provides a second polarity sensitive control element, for example a relay or a tube which is controlled only by the picture unit and is connected after the first control element, whereby the fine adjustment to the picture carrier frequency is obtained by the second polarized control element only when the first control element has interrupted the search run and has switched the adjusting motor to the second element to scan the fine tuning.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings.

Like parts in these figures bear the same reference characters.

Figure 1:
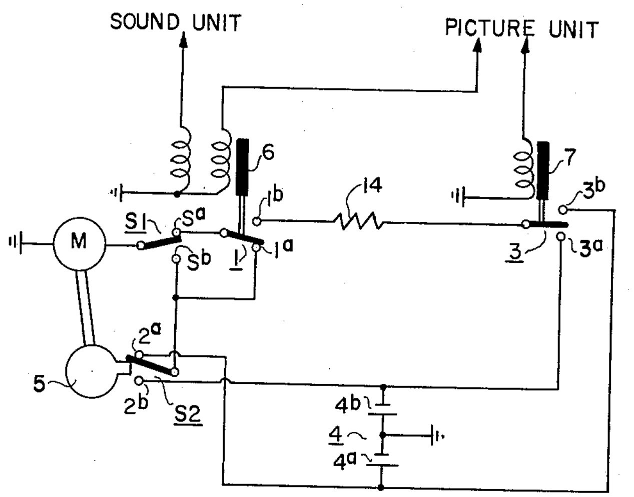
FIGURE 1 shows schematically an embodiment of the motor drive with automatic fine tuning scanning according to the invention.

In FIGURE 1, a motor M can be connected to the current sources *4a* or *4b* via switches $S_1$ and $S_2$ having switch positions *Sa*, *Sb*, *2a* and *2b*, wherein the motor makes a search run. There are mechanically connected to the motor M a continuously tunable element (not shown), such as a rotary condenser or a slidable variometer, and a control cam 5 for polarity reversal of the motor M after reaching the two limits of variation of the tunable element. If in the television band just switched in no television signal is received, the motor M in the position of the switches shown in FIGURE 1 continues to run in the same direction until the control cam 5 has arrived at a final position of the continuous tunable element connected with the television band switch. At this instant a reversal of the switch $S_2$ to the position *2b* is caused by the control cam 5 and thereby a polarity reversal of the motor, which then scans the just-scanned frequency range in opposite direction. This reversal at the extreme end positions of the variable tuning element of the television receiver takes place so long as the automatic tuning system does not receive television signals in either the picture or the sound units. As soon as a signal is received at the input of the set, i.e. when the picture and sound units simultaneously are energized, a control relay 6 responds and moves the switch 1 from the position *1a* to the position *1b*. Since this switching is only possible when picture and sound units are simultaneously energized, the polarized control relay 7 of the picture unit will respond alone and move the switch 3 to the position *3a* or *3b* in accordance with the frequency difference between the adjusted frequency and the desired picture frequency, i.e. the switch 3 will provide the motor M with the proper polarity until the picture frequency of the received television signal is exactly tuned. Therefore, a fine adjustment can only be carried out if picture and sound carrier are simultaneously present with the proper frequency separation. It is not possible for the automatic tuning means to respond to spurious frequencies, such as a sound carrier and the harmonic of a picture carrier of a certain channel, or to the picture carrier of one channel and the sound carrier of another channel, because in such case the frequency separation between said picture and sound carriers would not be correct, this separation being predetermined and fixed for all channels.

In the present design of the automatic tuning means the switch $S_1$ may be omitted and replaced by short-circuiting means. The switch $S_1$ has the following function: The described automatic scanning and tuning system produces an automatic adjustment of that receiving channel of the television band which is first reached during a search run by the motor M, and adjusts the tuning element within the frequency range of this channel. In case there are several channels broadcasting programs through different transmitters, which channels could all be received by the receiver, it would not be possible to automatically switch over from one adjusted channel to another. However, the switching over, if desired, is made possible by moving of the switch position S*a* to the position S*b*, whereby the function of the relays 6 and 7 is interrupted, and the search run is transferred to main channel tuning control means rather than to the fine tuning element until the control is advanced beyond the frequency of the undesired channel.

The motor drive in FIGURE 1 of the television channel 6 with automatic fine adjustment can only be used with a tuner continually tunable in a certain television band. However, it is possible to use it also for all of the bands if an additional switching control is provided containing, for example, in drum form the tuning elements of the various bands I, III, IV+V. Because the automatically operating tuning element of the automatic adjusting system can be designed in such a manner that it can be used in the combination in any band control position, it is merely necessary to switch over the band control to apply the above mentioned automatic scanning and tuning system to any of the television bands. In accordance with the further development of the invention, the band tuning control may be made switchable, for example by a combination of push-button switches.

Figure 2:
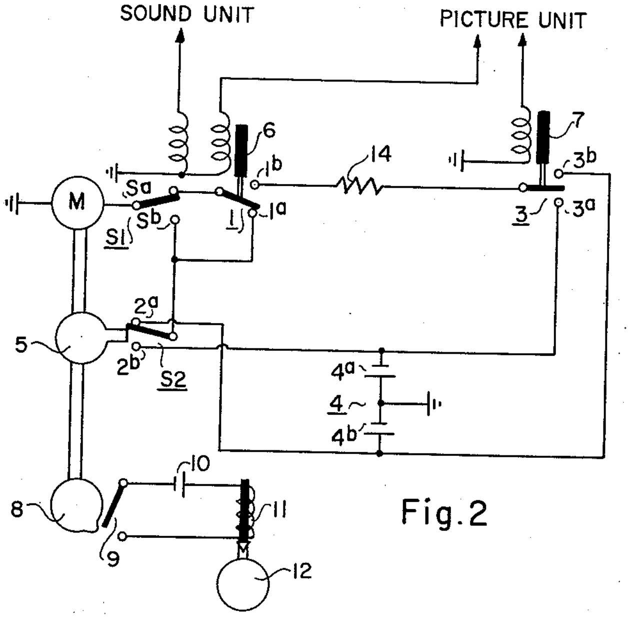
FIGURE 2 is a schematic diagram similar to FIGURE 1 but showing one embodiment for searching successive television bands.

It is a further characteristic of the invention that mechanical band selection can be included in the automatic scanning and adjusting system, said mechanical band selection employing means separate from the other automatic scanning and adjusting means. This is obtained in a simple manner, as shown in FIGURE 2, by mechanically connecting an additional control eccentric 8 to the rotor of the motor M, said control eccentric 8 operating a switch 9 only when the upper or lower limit of the just-switched-in television band is reached by the tuning cam which is likewise driven by the motor M. This switch 9 closes a circuit 10 effecting switching over to another frequency band by an actuator 11. It is also possible that the actuator 11 acts directly on a drum 12 provided with band tuning elements. The action of the cam 5 need not be interrupted in case of automatic band changing, because this action of the cam 5 is entirely limited in direction of travel in a television band to the direction of either larger or smaller frequencies.

It is furthermore possible, in accordance with the invention, to use in place of a separate electric control circuit 9, 10, 11 for the changing of the bands, mechanical means which run synchronously with the continuously tunable element driven by the motor M, whereby such mechanical means, for example the drum 12, at either the upper or the lower frequency limit, switches from each individual band to another band.

Figure 3:
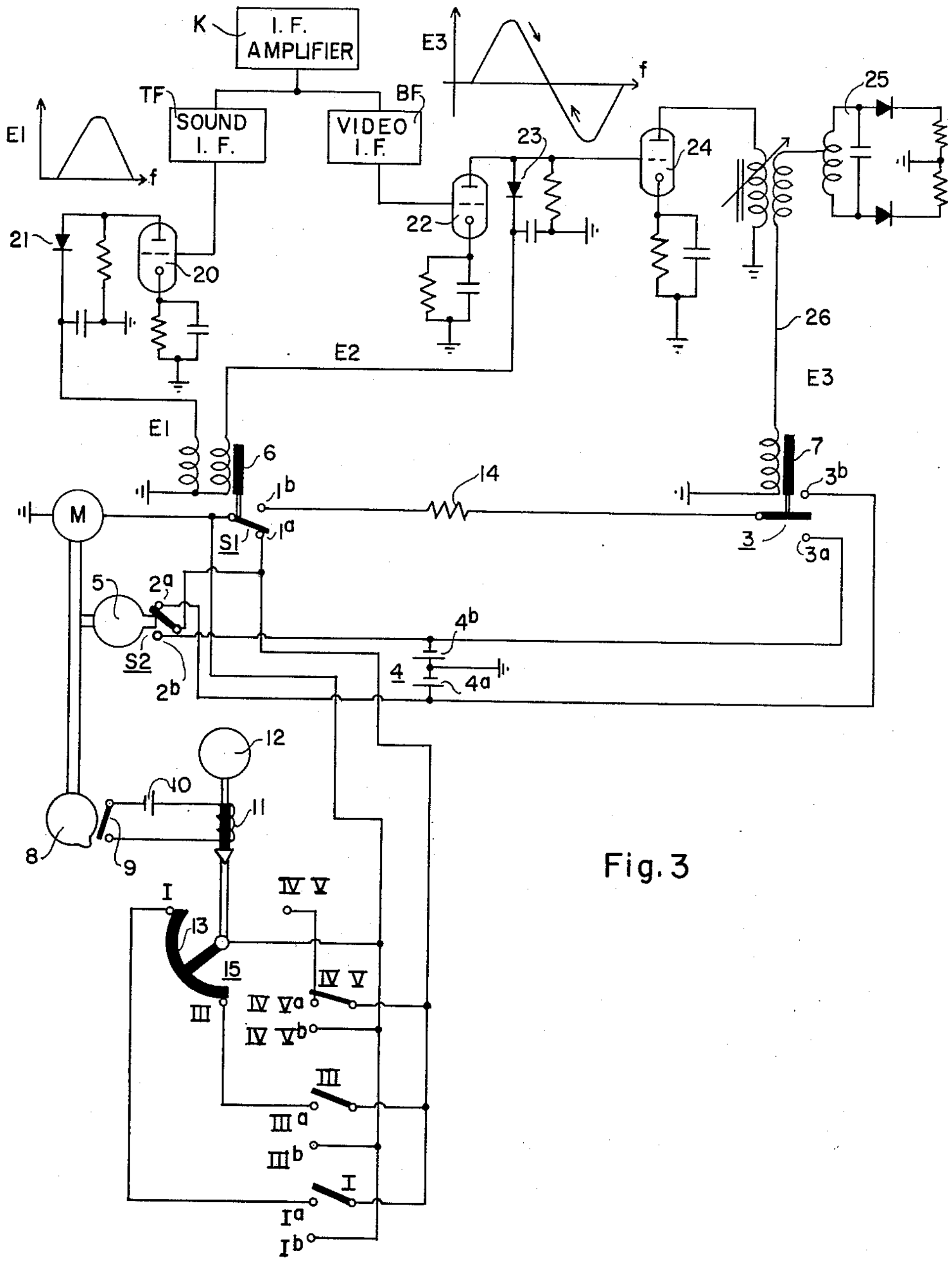
FIGURE 3 is a schematic diagram of another embodiment of the invention, but showing also band selecting switch means.

FIGURE 3 shows another embodiment of the invention according to which it is possible to interrupt the automatic search run, and said embodiment including control means whereby the automatic scanning and adjusting sequence corresponding to the above-mentioned embodiments can be interrupted, while band switching operations are carried out.

At the upper end of FIGURE 3, there is shown a portion of a television receiver including an I.F. amplifier K connected to deliver an incoming television signal to a sound I.F. amplifier TF and a video I.F. amplifier BF. The sound I.F. amplifier is connected to a tube 20 having a detector diode 21 in its plate circuit, the output of which is connected to one winding of a control relay 6.

The video I.F. amplifier BF is likewise connected to a tube 22 having a diode detector 23 in its plate circuit, the output of which is connected to the other winding of the relay 6, so that the relay is closed by simultaneous appearance of sound and video signals at correct preselected I.F. frequencies. The plate of the tube 22 is also connected to another isolation tube 24 having a discriminator circuit 25 in its anode circuit. When the picture channel is tuned exactly on center, no voltage appears in the lead 26 which is connected to the winding of the polarized relay 7. Thus, the relay is not actuated, because the channel is properly tuned. However, if the channel is mistuned, either a positive or a negative voltage will appear on the lead 26 depending on the direction of mistuning and, therefore, the polarized relay 7 will be closed in the correct direction for causing the motor M to correct the fine tuning.

FIGURE 3 is distinguished over FIGURE 2 in that contacts I, III, IV+V are provided as switches which are assigned to the individual television bands. 13 is a conductive segment which can be moved with the drum 12 carrying strip-like tuning elements as a result of the provision of step-by-step operating actuating means 11, said segment being stepped so as to always contact two of the three contacts, i.e. the segment 13 is connected to two contacts of the non-selected television bands (in FIGURE 3 the bands I and III), but so as not to contact the just-selected band (in FIGURE 3 the combined band IV+V). The contacts I, III, IV+V, together with the contact of the segment 13 carried by the rotating arm, form a switch-over or selector device 15 which in turn is actuated simultaneously with the band stepping actuator 11. Consequently, FIGURE 3 shows the segment in position to select band IV+V. When in this initial switch position, switch III*a* is closed, a search run voltage would be sent to the entire automatic adjusting system until the control eccentric 8 has been moved to the band III.

At the instant at which the band III is switched in, the segment 13 is disconnected from the contact III and is engaged with the contacts I and IV+V. Now the fine scanning operation is initiated within the band III and fine adjustment in the tuning range of the fine tuning element of the television set takes place. If several, for example two programs are transmitted on separate channels within the band III and if it would be possible to receive both of the latter in view of the field strength present at the receiver, a brief switching-off of the automatic means for fine tuning and thereby impressing of the scanning run from the first automatically adjusted carrier of this channel will cause selection of the next carrier within the band by opening of the switch III*a* and closing of the switch III*b*. The same is true for the bands I and IV+V. The switches I, III, IV+V are suitably designed as push-button switches, whereby the position *a* is suitably obtained by simply depressing and locking, while the position *b* is maintained only during the manual depressing of the button.

The switch $S_1$, FIGURES 1 and 2, and the switches I, III, IV+V, FIGURE 3, are distinguished from one another in that it is not possible using the switch $S_1$ to cause setting of a certain band by a brief actuation, while the switches I, III, IV+V make possible such operation in the positions *a*. The switch positions *b* of the switches I, III, IV+V are analogous to that of the switch $S_1$ in the switch position S*b*. The switches I, III, IV+V in switch position *a* are called band keys due to their indication of the band assigned thereto and the switch $S_1$ is called a search switch enabling searching for channels within any given band.

Figure 4:
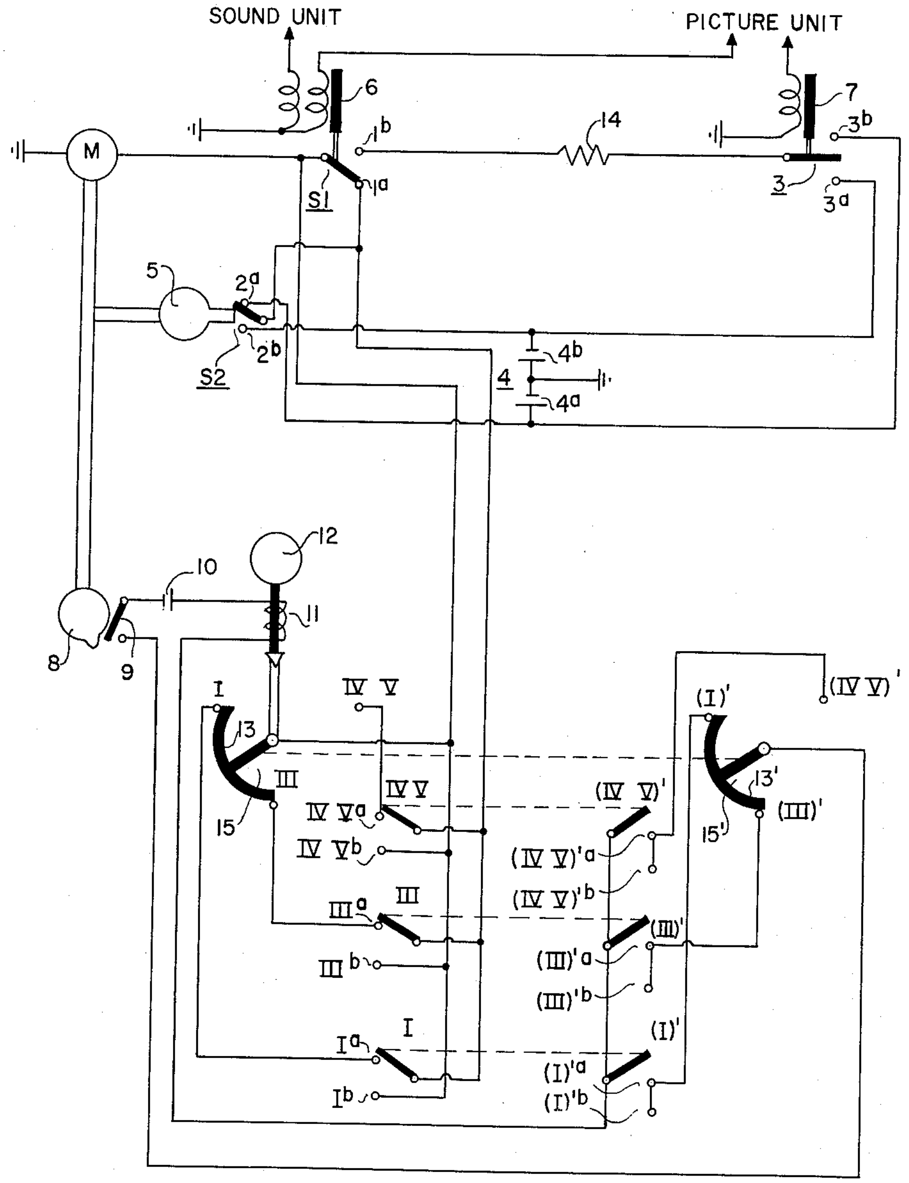
FIGURE 4 shows a still further embodiment of the invention similar to FIGURE 3, but especially adapted to the automatic selection of one of several channels within the same band.

In a circuit corresponding to FIGURE 3 having apparatus of the automatic tuning type, the switches I, III, IV+V in the position *a* serve as band switches (i.e. limited to the respective bands); this is not the case when the switches are in the position *b*. If the function of the said band switches is to be limited also in the position *b* to the band assigned to the individual switch, the circuit according to FIGURE 3 would have to be modified by the application of further switches (I)′, (III)′, (IV+V)′ of the type of the switches I, III, IV+V and by the application of another selector segment 15′ of the kind of the selector 15, as illustrated in the embodiment of FIGURE 4. The switches I, III, IV+V are mechanically connected with the respective switches (I)′, (III)′, (IV+V)′ in such a manner that, for example, a system of three double pole push-button keys is obtained. The selector device 15′ is mechanically coupled to the selector device 15 in such a manner that it runs synchronously therewith, whereby at each selection position of the selector devices the short-circuiting segments 13 and 13′ electrically interconnect each two adjacent contacts. The system of the additional switches (I)′, (III)′, (IV+V)′ is electrically connected to the additional selector 15′ and is inserted in the circuit 10 for the band actuation in such a manner that this circuit is still interrupted when the switch 9 for the band actuation is closed via the control eccentric 8 as long as such double switch I(I)′ or III(III)′ or IV+V(IV+V)′ is not actuated by the selection of a different band than the band just selected. Therefore, a further switching, for example from the band I can only take place if a switch which is not assigned to the just-selected band is closed. Upon actuation of one of these other switches, the automatic tuning searches until the control eccentric 8 closes the switch 9 and thereby causes stepping of the control actuator 11. By this switching operation the selector devices 15 and 15′ are further stepped and thereby the circuit for the search run by the motor M and the circuit 10 for the band stepping opens from those switch contacts which are assigned to the respective, now switched-in band. A further actuation of this switch in the position *a* or *b* can change nothing in this switch position of the selected band. Only channels within this band can be additionally selected by the actuation of this switch to the position *b*, i.e. the whole transmitting program of all of the channels of the band can be scanned.

Preferably the respective mechanically-coupled switches I and (I)′, III and (III)′ as well as IV+V and (IV+V)′ are designed as two contact switches. Obviously all of the functions of the switches I, III, IV+V on the one hand, and of the switch $S_1$, on the other hand, are alternately obtained so that the switches I, III, IV+V or I(I)′, III(III)′, IV+V(IV+V)′ can be omitted if switch S is present, or switch $S_1$ may be omitted if the just-mentioned switches are provided with their various functions.

The combination of the switches for the bands IV+V in common switches IV+V or (IV+V)′ is not intended to indicate a limitation to such combination; rather, it may be advantageous because the two bands are adjacent one another and therefore can be covered by the same continuously tunable fine tuning element, when the common band is selected. Obviously, it is possible to separate the combined bands IV+V and switch them separately, but four switches would be required in place of three switches.

A series resistance 14 is provided which is effective when the scanning operation is interrupted by the control relay 6 and the motor M is performing fine adjustment. While the search run shall be carried out as a rapid step, it is advantageous to scan the fine tuning at a slower speed. This is realized in accordance with the invention by adding the series resistance 14 to the circuit of the fine adjustment, while no additional resistance is added to the circuit for the search run.

According to a further development of this invention, the motor drive of the automatic scanning system is simplified and connected to an intermediate frequency point in the television set. In accordance with the invention the control element, for example the control relay or a control tube effecting the change-over from the search run to the automatic fine scanning of the picture frequency is solely controlled by the sound unit of the television set. In this case the control voltage derived from the sound detector of the television set is obtained by providing a mixer in connection with an intermediate frequency amplifier common to both picture and sound, which amplifier passes uniformly the picture and sound intermediate frequencies and amplifies the same. The picture and sound units are separated and the mixer, for example a diode, which is connected in the branch of the sound unit, produces the difference frequency from the picture and sound intermediate frequencies, the latter difference frequency being fed to the sound rectifier via the sound intermdiate frequency amplifier. This development of the present invention will be described with reference to FIGURE 5.

A is an intermediate frequency amplifier common to the picture and sound intermediate frequency. According to the present European standards the sound intermediate frequency is at 33.4 megacycles and the picture intermediate frequency at 38.9 megacycles. At the output of A the picture and sound frequencies are separated. B is the final picture stage, while D is a mixer, for example a diode, by which the said intermediate frequencies, picture and sound, are mixed. The sound intermediate frequency amplifier V passes only the difference frequency, i.e. 5.5 megacycles, and amplifies the same. A sound rectifier T follows the sound intermediate frequency amplifier V, said sound rectifier being directly connected to the control element 6. The mixing of picture and sound intermediate frequencies in the mixer D can be carried out without difficulty, because picture and sound are differently modulated, i.e. picture is amplitude-modulated and sound frequency-modulated.

Figure 5:
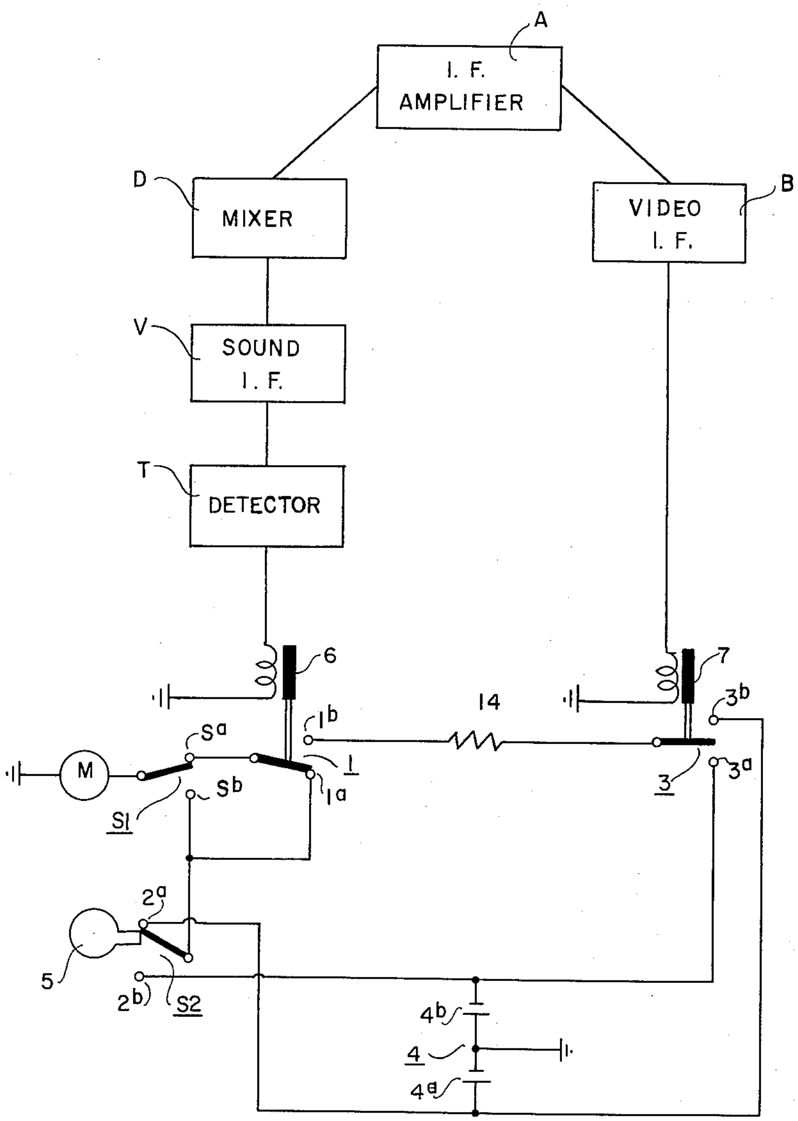
FIGURE 5 shows another embodiment of the invention by which the automatic system can be coupled to a television set.

The advantage which constitutes an advance in the embodiment of FIGURE 5 over the embodiments of FIGURES 1 to 4 resides in the fact that the difference frequency of 5.5 megacycles (European standard) at the output of the mixer D is independent of the receiver tuning and is determined only by the separation between the picture and sound intermediate frequencies (or of the high frequency carriers in case of corresponding modification of the apparatus), which is produced in the transmitter and predetermined. Disturbances by spurious or transient signals are excluded by the design of the automatic control for a difference frequency of 5.5 megacycles.

The other details of FIGURE 5 with the exception of the control element 6 which is solely controlled by the sound unit, and not by the picture and sound unit as in FIGURES 1 to 4, correspond to those of the latter figures. The indication of the difference frequency of 5.5 megacycles which is produced in the mixer is not intended as a limitation to the general principle of the invention. The method is likewise applicable for another difference frequency and a correspondingly changed pass-band for the sound intermediate amplifier B. The motor drive with the automatic tuning system according to FIGURE 5 may be combined with some of the specific features of the embodiments shown in the previous figures.

I claim:

1. A signal-seeking automatic tuning drive system for use with receiving equipment having a continuous tuning element tunable, within a television band, to frequencies including a picture frequency and a sound frequency having a predetermined difference separation therebetween, said system comprising: a motor connected to drive said tuning element, said motor being reversible by reversal of source polarity; a source of power to energize said motor; switch means controlling the flow of power to said motor, said switch means in a first position connecting the power directly to the motor to search the band, and in a second position connecting the motor to a fine tuning terminal; search relay means connected to said switch means and to said receiving equipment and moving said switch means from the first to the second position when a signal of a channel within said band energizes the receiving equipment, said search relay means being connected to receive said signal and responsive thereto when the difference between the picture and sound frequencies thereof equals said predetermined difference separation; fine tuning relay means connected between the source of power and the fine tuning terminal and controlled by the strength of the signal energizing the receiving equipment to stop the motor when the strength of said signal is maximum, said fine tuning relay means comprising a polarized relay connected to said receiving equipment and sensitive to the direction of one of said frequencies from the optimum tuning strength, said polarized relay energizing the motor with the correct source polarity to obtain maximum tuning strength; limit-switch means connected between said source and said motor and having contacts by which the polarity of the power to the motor is reversed by throwing of the switch; and switch throwing means connected with the tuning element to throw the switch whenever the motor drives the tuning element to an extreme end of its range.

2. In a system as set forth in claim 1, said receiving equipment having a band switch for selecting one of a plurality of bands and said continuous tuning element being operative for fine tuning each of said bands; and band switch stepping means comprising an electric actuator mechanically coupled thereto; a switch for controlling flow of power to said actuator; and mechanical switch closing means coupled with the tuning element to energize said actuator.

3. In a system as set forth in claim 2, said mechanical switch closing means comprising an eccentric connected with the continuous tuning element and closing the switch to energize the actuator when the tuning element has element reaches the end of its range.

4. In a system as set forth in claim 1, said receiving equipment having a band switch for selecting one of a plurality of bands; and mechanical band switch actuating means connected with said contiuuous tuning element and moving the position of the band switch when the tuning element reaches the end of its range.

5. In a system as set forth in claim 1, manually operable switch means for bypassing said relay means and connecting the motor to said source to move the fine tuning past an already selected signal in search of a different signal.

6. A signal-seeking automatic tuning drive system for use with receiving equipment having a channel switch for selecting one of a plurality of bands and a continuous tuning element tunable to frequencies within a communications band which tuning element is operative for tuning each of said bands, said system comprising: a motor connected to drive said tuning element; a source of power to energize said motor; switch means controlling the flow of power to said motor, said switch means in a first position connecting the power directly to the motor to search the band, and in a second position connecting the motor to a fine tuning terminal; search relay means connected to said switch means and to said receiving equipment and moving said switch means from the first to the second position when a signal of a channel within said band energizes the receiving equipment; fine tuning relay means connected between the source of power and the fine tuning terminal and controlled by the strength of the signal energizing the receiving equipment to stop the motor when the strength of said signal is maximum; band switch stepping means comprising an electric actuator mechanically coupled thereto to rotate said switch; means driven by said motor for periodically energizing said actuator; a push-switch associated with each band; a contact associated with each push-switch and connected thereby with the source; and a conductive segment connected with the motor, the segment being rotated with the band switch and in each position touching all of the contacts except the one associated with the existing band switch position, whereby the motor will be continuously energized through the segment until the band switch is in the position corresponding with the selected push-switch.

7. In a system as set forth in claim 6, said push-switches being of the type wherein the last one of them pushed remains locked until another is pushed, and auxiliary momentary switch means connected to energize the motor directly from the source while depressed to initiate further scanning of the fine tuning element.

8. In a system as set forth in claim 7, said retaining switch means comprising a second set of contacts each also associated with a band and a second segment connected with said band switch and wiping all of said contacts except one, the segments and contacts being interposed in the energizing circuit to the band switch actuator whereby the band switch can be actuated only by pushing of a different push-switch whereby depressing of the auxiliary switch initiates scanning only within the selected band.

9. In a system as set forth in claim 1, said receiving equipment having an intermediate frequency unit containing said picture-frequency and said sound-frequency, and said system including a mixer connected with said unit for mixing said sound-frequency and said picture-frequency to obtain a difference frequency; means for detecting said difference frequency and operatively connected to control said search relay means; and said fine tuning relay means being connected with said unit to receive the picture-frequency and including detecting means operatively controlling the fine tuning relay.

References Cited in the file of this patent

UNITED STATES PATENTS

| | | |
|---|---|---|
| 2,890,274 | Guyton | June 9, 1959 |
| 2,898,400 | Parmet et al. | Aug. 4, 1959 |

FOREIGN PATENTS

| | | |
|---|---|---|
| 960,113 | Germany | Mar. 14, 1957 |

OTHER REFERENCES

"Push-Button Remote TV Tuning," Radio and Television News, December 1956, pp. 94 and 95.

"Two New TV Remote Controls," Radio-Electronics, February 1957, pp. 42 to 44.